US007372957B2

(12) United States Patent
Strathmeyer et al.

(10) Patent No.: US 7,372,957 B2
(45) Date of Patent: May 13, 2008

(54) METHOD AND APPARATUS FOR IMPLEMENTING CALL PROCESSING IN PACKET TELEPHONY NETWORKS

(75) Inventors: Carl R. Strathmeyer, Reading, MA (US); Donald K. Finnie, Berkshire (GB); Hugh P. Mercer, Hollis, NH (US)

(73) Assignee: Intel Corporation, Santa Clara, CA (US)

( * ) Notice: Subject to any disclaimer, the term of this patent is extended or adjusted under 35 U.S.C. 154(b) by 609 days.

(21) Appl. No.: 10/328,955

(22) Filed: Dec. 24, 2002

(65) Prior Publication Data

US 2004/0120502 A1    Jun. 24, 2004

(51) Int. Cl.
*H04M 3/00* (2006.01)
*H04M 5/00* (2006.01)

(52) U.S. Cl. ............................ 379/265.01; 379/265.02; 379/265.09

(58) Field of Classification Search ........... 379/265.01, 379/265.02, 265.03, 265.04, 265.05, 265.06, 379/265.07, 265.08, 265.09
See application file for complete search history.

(56) References Cited

U.S. PATENT DOCUMENTS

| | | | |
|---|---|---|---|
| 6,175,562 B1 | 1/2001 | Cave | |
| 6,263,051 B1 | 7/2001 | Saylor et al. | |
| 6,314,176 B1* | 11/2001 | Gunasekar | 379/265.01 |
| 6,614,781 B1* | 9/2003 | Elliott et al. | 370/352 |
| 6,678,266 B1* | 1/2004 | Hollatz et al. | 370/352 |
| 6,700,972 B1* | 3/2004 | McHugh et al. | 379/265.13 |
| 6,731,744 B1* | 5/2004 | Khuc et al. | 379/265.01 |
| 6,760,429 B1* | 7/2004 | Hung et al. | 379/265.09 |
| 6,788,677 B1* | 9/2004 | Fukuyama et al. | 370/355 |
| 6,990,524 B1* | 1/2006 | Hymel | 709/227 |
| 2002/0054090 A1 | 5/2002 | Silva et al. | |
| 2002/0055975 A1* | 5/2002 | Petrovykh | 709/205 |
| 2003/0021406 A1* | 1/2003 | Ostapchuck | 379/265.02 |
| 2004/0032944 A1* | 2/2004 | Finnie et al. | 379/265.02 |
| 2004/0120501 A1* | 6/2004 | Celi et al. | 379/265.01 |
| 2004/0223490 A1* | 11/2004 | Donovan et al. | 370/352 |

FOREIGN PATENT DOCUMENTS

| | | |
|---|---|---|
| JP | 2000-509570 | 7/2000 |
| JP | 2002-057724 | 2/2002 |
| JP | 2002-190827 | 7/2002 |
| WO | 97039561 A1 | 10/1997 |
| WO | WO 98/49809 | 11/1998 |
| WO | WO 02/074054 A2 | 9/2002 |
| WO | WO 03/098905 A1 | 11/2003 |

OTHER PUBLICATIONS

Eric W. Burger, "SIP and VoiceXML for Enhanced Media Services," SIP Summit 2001, May 2, 2001, pp. 1-14, SnowShore Networks, Inc.

(Continued)

*Primary Examiner*—William J. Deane, Jr.
(74) *Attorney, Agent, or Firm*—Kacvinsky LLC

(57) ABSTRACT

Various method and apparatus are provided to perform call routing, queuing and other call processing in packet telephony networks. In one embodiment, an automatic call distributor (ACD) system to perform call processing for packet telephony calls may include a call control proxy subsystem coupled to an ACD application. The call control proxy subsystem may be arranged to handle call control for packet telephony calls on behalf of one or more other subsystems or endpoints. The ACD application may control or coordinate call processing for packet telephony calls.

47 Claims, 5 Drawing Sheets

OTHER PUBLICATIONS

Rosenberg et al., "An Application Server Component Architecture for SIP," Mar. 2, 2001, pp. 1-37, http://www.jdrosen.net/papers/draft-rosenberg-sip-app-components-01.txt, Aug. 30, 2002.

Rosenberg et al., "A SIP Interface to VoiceXML Dialog Servers," Jul. 13, 2001 pp. 1-15, http://www.softarmor.com/sipping/drafts/draft-rosenberg-sip-vxml-00.txt,> Aug. 29, 2002.

"SALT: Speech Application Language Tags (SALT), 1.0 Specification," Jul. 15, 2002, pp. 1-15, SALT.1.0,doc, Copyright by: Cisco Systems, Inc., Comverse, Inc., Intel Corporation, Microsoft Corporation, Philips Electronics N.V., SpeechWorks International Inc.

Kip Hampton, "Creating VoiceXML Applications with Perl," Aug. 9, 2001, pp. 1-4, http://www.xml.com/pub/a/2001/08/09/perlxml.html; Oct. 1, 2002.

\* cited by examiner

METHOD AND APPARATUS FOR IMPLEMENTING CALL PROCESSING IN PACKET TELEPHONY NETWORKS

BACKGROUND

Users of traditional circuit-switched telephone systems, such as the Public Switched Telephone Network (PSTN), have recognized the need to route and queue calls. Call routing and queuing are typically performed in customer service centers or call centers and other locations that handle large volumes of calls. Typically, a large number of calls are placed to a single telephone number, often known as a virtual telephone address or virtual telephone number. A virtual telephone address is often a telephone number that does not correspond to a real telephone endpoint where a physical device is provided for receiving the call. Rather, a virtual telephone address may be a telephone number where calls are received at a virtual endpoint for call routing to another endpoint. For example, a virtual telephone address may correspond to a queue or even a group of telephone endpoints. On the other hand, a real telephone address typically corresponds to a telephone endpoint where a physical device, such as a telephone, may receive and place calls.

An automatic call distributor (ACD) is a device or system that typically performs call routing and queuing functions. The ACD may route calls to an agent or service representative and/or queue the calls until a service representative is available.

The following capabilities are features sometimes found in traditional circuit-switched telephony ACDs.

Call Routing: Calls may be addressed to a virtual telephone address that causes special call routing logic, for example in the ACD, to be applied before the call is forwarded to an actual telephony endpoint. When a call is addressed to a virtual telephone address, an ACD typically directs or routes the call to some other telephone address (real or virtual). The ACD commonly routes the call based on, for example, rules known to the ACD, properties of the call such as time of day, caller telephone address, etc., direction from an external application via a computer-telephony integration (CTI) link, or voice interaction with the caller to determine additional information about the caller's identity, intention, etc.

Call Queuing: Calls may be addressed to a virtual telephone address at which calls may wait for available resources before being processed. A virtual telephone address is usually a telephone address that corresponds to a queue or a group of telephone endpoints. Endpoint groups can be static or can dynamically change in real time, for example, as customer service agents report for work or leave after their shifts end. Endpoint groups can be comprised of physical telephone addresses, or can be a virtual group comprised of a set of customer service representatives selected according to their identities, work assignments and/or skills. Calls received at the virtual telephone address may be placed in a queue until the calls can be routed to the appropriate service representative or agent.

Call Treatment/Processing: While calls are waiting in queues, it may be necessary to play audio to the caller and/or to accept dual-tone multi-frequency (DTMF) tones and/or speech input from the caller. This interaction may be controlled by a system such as an ACD or an application to periodically inform the caller of their position in queue, expected waiting time, and other information. Features such as call queuing, routing and call treatment are almost universally implemented as proprietary capabilities within a telephone system.

While voice calls have traditionally been transported over the public circuit-switched networks, such as the PSTN, voice calls are now commonly transported over packet-switched networks such as the Internet or Internet Protocol (IP) networks, as examples. IP typically refers to the Internet Protocol (IP) as defined by the IETF standard 5, RFC 791, adopted in September, 1981 ("IP Specification"). Telephone calls made over IP networks are often referred to as Voice Over IP (VoIP) calls or IP Telephony calls. In general, telephone calls made over packet switched networks, such as IP networks or the Internet, will be referred to herein as packet telephony calls. Systems that are involved in the transmission of voice calls over packet-switched networks will be referred to herein as packet telephony systems.

Call routing and queuing capabilities are less common in packet telephony systems. Existing implementations in packet telephony systems generally continue the commercial model used in traditional circuit telephony systems, namely that call routing, queuing and processing functions are typically available only within proprietary packet telephony products or systems. As a result, it can be very difficult to change the product, add or modify features or integrate third party products to such a packet telephony system.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Figure 1:
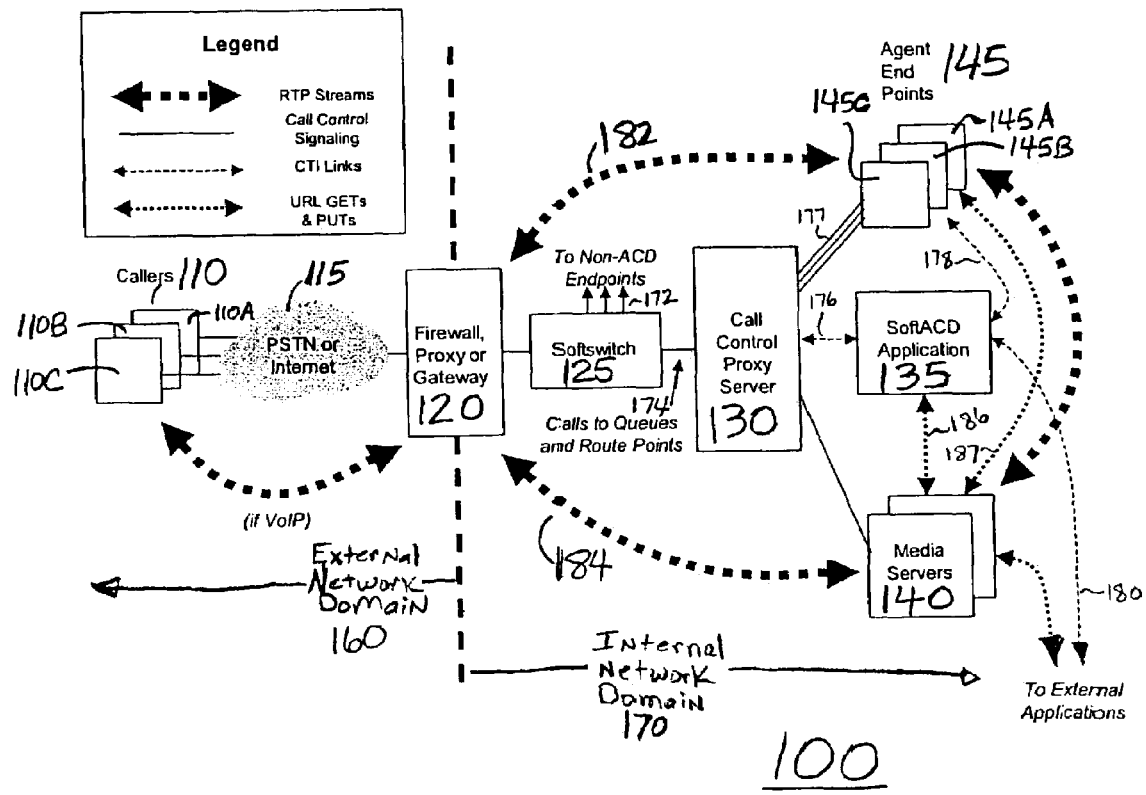
FIG. 1 illustrates a system suitable for practicing an example embodiment of the invention.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" or the like in various places in the specification are not necessarily all referring to the same embodiment.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

Various methods and apparatus are disclosed for implementing call routing, queuing and other call processing functions in a packet telephony network. One or more example embodiments are disclosed of an interconnection of modular packet-switched network subsystems that may provide ACD and other call processing functionality for a packet-switched network. In addition to achieving this valuable and useful mode of operation, the present invention may provide further advantages over traditional ACDs arising from the disclosed modular method of construction. These advantages may include, for example, greater flexibility of configuration, easier adjustment of operational characteristics, technical familiarity to those skilled in the art of modular packet-switched networks, reduced cost due to the commodity nature of the modular components utilized, and use of standards.

In one embodiment, a packet telephony system is provided that may include one or more subsystems such as a gateway which may convert between protocols and physical facilities, a softswitch which may resolve or translate call addresses and may direct call setup requests to the appropriate endpoint. The system may include a call control subsystem (such as a call control proxy server) to handle call control (e.g., call setup) functions on behalf of other subsystems and endpoints, a media subsystem (such as a media server) that may generate or apply a variety of media or perform other call processing functions, and one or more agent endpoints. Each agent endpoint may include a computer and software to provide call management functions needed by call agents in handling calls. The system may also include an ACD application which may coordinate or control the actions of the other subsystems to implement desired ACD call processing capabilities, such as queuing, routing, media processing, etc. According to one embodiment, the call control proxy server, the ACD application, the media servers and agent endpoints may comprise a packet telephony ACD system which provides ACD (automatic call distributor) functions for packet telephony calls.

Various embodiments may provide a number of additional features. The call control proxy server may monitor and control the state of calls at media servers and agent endpoints, and may control the setup and teardown of calls to these subsystems. The call control proxy server may report the state of calls to the ACD application, and may execute call control instructions from the ACD application (e.g., instructions to setup a call or route a call to a particular endpoint). In addition, various subsystems or devices may receive call processing instructions generated by the ACD application. The call processing instructions may be sent as separate instructions, or in the form of a media processing script, for example.

In one embodiment, the gateway may be coupled between a first network and a second network. As an example, the first network may be a public or untrusted network, while the second network may be a trusted network where the packet telephony ACD system is provided to perform call routing, queuing and call processing for packet telephony calls. The use of such a gateway allows calls to be communicated across two different types of networks, different protocols and media types, etc., which may be transparent to the caller. The gateway may also operate as a firewall to prevent unwanted packets or messages from passing into the trusted network.

In one embodiment, non-ACD endpoints may register their call addresses or telephone addresses with the softswitch. Also, the call control proxy server may register telephone addresses of virtual endpoints (also known as route points or virtual telephone addresses) with the softswitch for which call control proxy server will be handling call control. Registration may include, for example, providing the telephone address being registered and the network address (e.g., IP address) of the subsystem which should receive the call control messages. After address registration, any call setup requests or other call control messages received by the softswitch will be forwarded (e.g., to the call control proxy) based on the corresponding network address that was registered for that telephone address.

According to an embodiment, after receiving a call setup request, the call control proxy server may notify the ACD application of the receipt of the call setup request via a standard interface, such as a CTI link. The ACD application may control other subsystems to process the call, such as to route the call to a particular endpoint (such as an agent endpoint), to place the call in a queue to await an agent, and/or to apply media processing to the call.

According to another embodiment, the ACD application may dynamically generate or compose a media processing script. A media processing script may include one or more instructions identifying the specific media that should be generated or applied to a call, such as audio, speech, text, web pages, video, graphics, etc. The media processing script may also include instructions to perform other types of call processing, such as to receive a caller input or response, detect and forward predetermined signals or caller input, etc. Although not required, a media processing script may be written in a standard script language, such as VoiceXML or SALT, as examples. Media processing scripts written in a standard script language may be referred to as standard language media processing scripts.

According to an embodiment, the ACD application may dynamically generate or compose a media processing script, and then provide the script or a pointer or identifier (such as a URL) to the script to a media server to apply media to a call. In one embodiment, the media processing script may be generated in real-time or dynamically based on different types of information, such as current call status (such as a position in a call queue) or information related to the call or caller (such as caller's card number, current account balance) or other information, as examples. The incoming call may be established or routed to the media server, and the media server may then apply or generate media to the call in accordance with instructions in the retrieved media processing script. The use of dynamically generated standard language media processing scripts allows an ACD application to provide highly customizable media processing instructions that can be understood by media servers and other subsystems. The use of a standard language for media processing scripts advantageously allows, for example, these scripts to be generated by one vendor's ACD application and then interpreted or applied by another vendor's media server or other device.

In yet another embodiment, rather than using a remote media server to generate media that is forwarded to the caller over a network, media may be locally generated to the caller. According to an embodiment, a media processing script, such as a standard language media processing script, may be generated by the ACD application and forwarded to a device associated with the caller (e.g., the caller's computer or suitably equipped telephone). The caller's device or computer may then locally generate media to the caller in accordance with the media processing script. The caller's computer (or calling node) may include software or logic to interpret media processing scripts and then generate or apply media to the call or caller. Caller inputs or responses may be detected by the calling node and forwarded to the ACD application for processing. Additional media processing scripts may be generated by the ACD application based on the caller responses or other information. These additional media processing scripts may retrieved by the calling node and used to apply or generate additional media, such as an update as to the caller's position in the queue and estimated waiting time, for example. The ACD application may also instruct the calling node to terminate the generation of media and the call may be established or routed to an endpoint, such as an agent endpoint.

According to an embodiment, it may be advantageous to provide ACD (automatic call distributor) functions such as an ACD application that are separate and/or distinct from one or more other subsystems in the packet telephony system (such as the call control proxy server, media server, gateway, softswitch, etc.). Providing an ACD application that is separate and/or distinct from one or more other subsystems in the packet telephony system may allow the ACD application to be independently improved or upgraded without impacting or being limited by the other subsystems, and vice-versa. The general use of at least some separate subsystems may enhance scalability and modularity of the system, and may create more multivendor independence. For example, using an ACD application that is distinct from the media server and call control proxy server may allow the ACD logic to be upgraded or improved without requiring modifications to these other subsystems.

As another example, the use of a call control proxy server to register telephone addresses corresponding to virtual endpoints (such as queues and other route points) with the softswitch may allow the softswitch to appear (e.g., to incoming calls or callers) to provide ACD features for incoming calls without requiring any changes to the softswitch. In such an arrangement, it is unnecessary to embed such ACD functions in the softswitch. A more flexible approach may be to provide ACD functions separate from the softswitch. This may allow a system to be assembled that uses a softswitch from one vendor, while using an ACD application from a different vendor. Also, keeping ACD functions separate from the softswitch may avoid taxing the processing capabilities of the softswitch and allow each vendor to independently upgrade its subsystems without impacting the others.

According to an embodiment, the various subsystems in the packet telephony system may advantageously communicate with one or more other subsystems via one or more standards-based interfaces, well-known or standard protocols, standard language media processing scripts or script files, or other standards-based communication techniques. This may also enhance the modularity and scalability of the packet telephony system since the various subsystems may be assembled from different vendors or manufacturers, and may communicate using various standards or standards-based interfaces or standard language scripts. These standards-based communication techniques may include, for example, a standards-based CTI link, one or more standard protocols such as H.323, SIP, etc., and several standard language media processing scripts.

Referring now in detail to the drawings wherein like parts are designated by like reference numerals throughout. FIG. 1 illustrates a system suitable for practicing an example embodiment of the invention. System 100 illustrated in FIG. 1 provides an example embodiment where packet telephony calls or the like may be placed, received and processed. As shown in the example embodiment of FIG. 1, system 100 may include several types of packet telephony subsystems (120, 125, 130, 135 and 140, as examples) to allow calls to be placed, received, queued, routed or otherwise processed. The subsystems may be provided, for example, to allow calls to be placed, received, processed, and routed between callers 110A-C and agent end points 145A-C.

Each subsystem may comprise, for example, software or other logic provided on a node, where a node may comprise a computer, a server, switch, router, bridge, gateway, personal digital assistant, mobile device and so forth. Also, in other embodiments, two or more subsystems may be provided on a single node, where the subsystems on a single node may communicate via a software interfaces or other techniques, for example. Each subsystem may process information and may communicate with one or more of the other subsystems via a communications medium. A communications medium may include any medium capable of carrying information signals, such as twisted-pair wire, co-axial cable, fiber optics, radio frequencies, electronic, acoustic or optical signals, and so forth. As noted, subsystems may even communicate with each other via a software interface or other technique.

Each subsystem shown in FIG. 1 may be coupled to one or more other subsystems via a point-to-point link or via a network, such as the Internet, a Local Area Network (LAN) or the PSTN, as examples. Subsystems may also communicate through wires, buses or software interfaces, as additional examples. Each subsystem may communicate with other subsystems or devices by communicating information in the form of relatively short messages or packets in accordance with one or more communications protocols. A packet in this context may refer to a set of information of a limited length, with the length typically represented in terms of bits or bytes. An example of a packet length might be 1000 bytes.

A protocol may comprise a set of instructions by which the information signals are communicated over the communications medium. For example, the protocol might be a packet switching protocol such as the Transmission Control Protocol (TCP) as defined by the Internet Engineering Task Force (IETF) standard 7, Request For Comment (RFC) 793, adopted in September, 1981 ("TCP Specification"), and the Internet Protocol (IP) as defined by the IETF standard 5, RFC 791, adopted in September, 1981 ("IP Specification"), both available from "www.ietf.org" (collectively referred to as the "TCP/IP Specification"). The Hyper-Text Transfer Protocol (HTTP)/1.1, defined in RFC 2068, is also a protocol often used for communication over packet-switched networks such as the Internet.

There are many additional protocols commonly used for communicating audio (including voice telephone calls), video and data over packet-switched networks such as the Internet. One such protocol is the set of standards under a standard umbrella termed "ITU-T Recommendation H.323 (1998), Packet Based Multimedia Communications Systems," also referred to as "H.323." "Session Initiation Protocol" or "SIP," defined in RFC 2543 (March, 1999) and RFC 3261 (June, 2002), is another protocol that is often used in the communication of information such as voice telephone calls and video over packet-switched networks. Another protocol, Real-Time Transport Protocol, defined in "RTP: A Transport Protocol For Real-Time Applications," RFC 1889 (1996), referred to as "RTP," provides network transport functions suitable for applications transmitting real-time media, such as audio (including voice) and video. All of the standards identified herein are provided as examples, and there may be one or more revisions to each of these standards.

Referring to FIG. 1, the structure and arrangement of system 100 will now be described in more detail. System 100 may include one or more callers 110, such as callers 110A, 110B and 110C. Each caller 110 may place or initiate a telephone call to one or more parties. Each caller 110 may use a telephone to place the call, such as an analog telephone to place a call over the PSTN, or a packet telephony telephone (e.g., H.323 telephone or SIP telephone) to place a call over a packet-switched network. The callers 110 are coupled to a network 115. Network 115 may be any type of network, such as the PSTN or the Internet, for example.

System 100 may include one or more agent end points 145 where one or more agents or service representatives are located for handling incoming telephone calls. A telephone may be coupled to each agent end point, such as a packet-telephony telephone or an analog telephone or the like, to allow agents to receive and place calls. A node or computer with software may be provided at each agent endpoint.

System 100 may include one or more subsystems, such as a gateway 120, a softswitch 125, a call control proxy server 130, an automatic call distributor (ACD) application 135 and one or more media servers 140. In the example embodiment shown in FIG. 1, gateway 120 may be coupled to network 115, while softswitch 125 may be coupled between gateway 120 and call control proxy server 130. One or more agent endpoints 145A-C may be coupled to call control proxy server 130 and may also be coupled to ACD application 135 and media servers 140. ACD application 135 and media servers 140 may each be coupled to call control proxy server 130. Each of the subsystems 120, 125, 130, 135 and 140 will now be described, according to various example embodiments.

Gateway 120 in general may provide conversion between the protocols and physical facilities used within the external network domain 160 (including callers 110 and network 115) and the protocols and facilities used in internal network domain 170 (including subsystems 125, 130, 135, 140 and end points 145) in which the ACD functions are implemented. In other words, gateway 120 may provide protocol interworking or conversion, to convert signals, messages and media (e.g., data, voice and video information) between different protocols. Gateway 120 may comprise a signaling gateway and/or a media gateway. The term "signaling" may refer to control signals or messages for control-related functions such as call setup and teardown. The term media may refer to different types of information that may be communicated such as audio (including voice), video and data.

In providing signaling gateway functionality, gateway 120 may convert control signals, messages or signaling between protocols used in network domain 160 and control signals, messages or signaling for a protocols used in network domain 170. For example, gateway 120 may convert call control signals from a PSTN-compatible protocol and convert these call control signals received via network 115 to one or more corresponding call control messages or packets compatible with an IP network, such as H.323 or SIP. Thus, Gateway 120 may receive a call setup request signal (requesting the setup of a PSTN call) from a PSTN network (e.g., network 115) and then generate and send a corresponding SIP Invite message, which may request the setup of a corresponding packet telephony call.

As another example, if the network 115 comprises an Integrated Services Digital Network (ISDN) network, then gateway 120 may receive an ISDN call setup request including the dialed telephone number as a DNIS (dialed number identification service) signal. Gateway 120 may then generate a SIP Invite message or other call setup message which may include the dialed telephone number in a field of the SIP Invite message. The SIP invite message may be sent to one or more subsystems or components in the network domain 170, such as softswitch 125. PSTN, ISDN and SIP are just example protocols. Gateway 120 may provide protocol conversion or protocol interworking between any types of protocols.

In an example embodiment, external network domain 160 may also comprise an untrusted network such as the Internet or PSTN, while network domain 170 may comprise a trusted network, such as a local area network (LAN), as examples. In such case, gateway 120 may provide isolation between the untrusted and trusted networks or network domains. This isolation can take many forms depending on the nature and status of the untrusted network. In an example embodiment, gateway 120 may include a firewall to allow only certain types of packets or traffic to pass from network domain 160 to network domain 170. As a result gateway 120 may also be shown in FIG. 1 as a firewall. In addition, because gateway 120 may perform functions for or on behalf-of other subsystems (such as protocol interworking), gateway 120 may also be referred to as a proxy.

In providing media gateway functionality, gateway 120 may convert media (e.g., voice, video, data) between different types of protocols. For example, gateway 120 may receive analog voice signals of a PSTN call via network 115 as an example, and then samples and digitizes the voice signals. Gateway 120 may set up an RTP session between itself and a call destination over a packet-switched network. Gateway 120 may then send the digitized voice signals in the payload of one or more RTP packets over the RTP session to the destination. In this manner, gateway 120 may function as a media gateway by converting media between different formats or between different protocols.

Gateway 120 may isolate the external caller from unnecessary packet telephony signaling messages. In an embodiment, if both the external caller and the trusted internal network domain 170 are using the SIP protocol for call signaling, gateway 120 may identify and trap the SIP messages directed towards the caller that reflect the various terminations and redirections of the call within the trusted network. Gateway 120 may act upon those messages locally and may not forward them to the caller's endpoint.

Softswitch 125 is a subsystem which may resolve or translate call addresses (e.g., called telephone numbers or called addresses) and may direct connection requests or call setup requests to the appropriate endpoint, the next hop or next subsystem. Softswitch 125 may, for example, resolve a first call address used by a first protocol to a second call address used by a second protocol. Softswitch 125 may resolve address translation and permission issues during call setup. Softswitch may handle control signals or signaling (for example for call setup or call control), but typically does not handle media signals or participate in media paths. A media path may be a path which media signals (e.g., audio, voice, video) may take through system 100 or a network to reach a call destination or endpoint.

For example, as part of address translation (or address resolution) function, softswitch 125 may receive a SIP Invite message or other call setup request that identifies the call destination as a telephone number, for example. The Softswitch 125 may resolve or translate the called telephone number to a corresponding call address having a different format (different from the telephone number), such as an IP address or SIP URL. A URL may be a uniform resource locator, which may be a string of text that identifies a resource via its name, location or other characteristic. Softswitch 125 may resolve or translate the address using a variety of different techniques, such as database lookup, etc. For instance, softswitch 125 may perform a database lookup using the called telephone number and identify the corresponding IP address or SIP URL to which the SIP message (or other call setup request) should be forwarded for handling.

Softswitch 125 need not be devoted solely to handling calls requiring ACD features, such as queuing, routing and call processing. Rather, softswitch 125 can also handle ordinary packet telephony calls directed to simple physical endpoints (i.e., calls not requiring ACD functions, such as routing and queuing) as well as calls directed to virtual endpoints or virtual addresses that require special call routing and queuing (ACD functions). Calls not requiring ACD functions, such as those directed to simple physical endpoints are shown in FIG. 1 as calls 172 to non-ACD endpoints.

In an example embodiment, if a call is addressed or directed to a call address or endpoint not requiring ACD functions (e.g., routing, queuing), the softswitch 125 identifies the corresponding address of the appropriate endpoint and forwards the call setup request to the non-ACD endpoint via lines 172. On the other hand, if the call is directed to a virtual telephone address or virtual endpoint, the softswitch 125 may perform the address lookup (e.g., telephone number to IP address lookup in a database) and forwards the call setup request to the identified address. In an example embodiment, the call may be addressed to a virtual telephone address or virtual endpoint (also known as a virtual route point) at a call center, where additional call routing and queuing may occur. In such case, softswitch 125 may perform an address lookup in a database to identify the network address or other address of an appropriate call control proxy server 130 for handling calls directed to that virtual endpoint.

Call control proxy server 130 interposed between softswitch 125 and one or more endpoints, such as endpoints 145, ACD application 135 and media servers 140. Call control proxy server 130 may intercept call control messages and participate in the packet telephony call control signaling that affects endpoints 145, but typically does not participate in media paths. Call control proxy server 130 may determine the state of endpoints 145, and may report those endpoints' call states and call events to other subsystems such as the ACD Application 135. Call states and call events may, for example, include notification that a device is connected to an inbound call which it received, is currently initiating an outbound call, or is idle (i.e., on-hook).

Call control proxy server 130 may register telephone addresses or call addresses of virtual endpoints (also known as route points or virtual telephone addresses) with the softswitch 125. These addresses registered with softswitch 125 are the call addresses or telephone addresses for which call control proxy server 130 will handle call control (e.g., call setup, teardown). This registration information may comprise, for instance, the telephone address (such as a telephone number) and an address (such as an IP address or other address) of the call control proxy server. Softswitch 125 may store this registration information in a database for lookup. Thus, after registration of a telephone address with softswitch 125 by call control proxy server 130, a subsequent call control message directed to such registered address and received at softswitch 125 may cause softswitch 125 to resolve this telephone address through a database lookup, for example. In this example, softswitch 125 may resolve the registered call address or telephone address to an address, such as a network address, of the call control proxy server 130 (e.g., IP address or SIP URL of call control proxy server 130). As a result, softswitch 125 may then forward the received call control message to the identified address, the call control proxy server 130 in this case.

Although not shown in FIG. 1, the various subsystems or entities of system 100 may be coupled together via point-to-point links, or more commonly, via one or more networks. For instance, gateway 120 may be coupled to softswitch 125, agent endpoints and media servers 140 via the Internet or other network. Thus, gateway 120 may establish RTP sessions (for media transport) for packet telephony calls with agent endpoints 145 or with media servers 140 via the Internet or other network. In an embodiment, softswitch 125, call control proxy server 130, ACD application 135, media servers 140 and telephones for agent endpoints 145 are all coupled together via a local area network (LAN).

In addition, agent endpoints 145 and media servers 140 may also register their respective call addresses with softswitch 125. As agent endpoints 145 and media servers 140 send registration messages to register their respective call addresses with softswitch 125, call control proxy server 130 intercepts these registration messages and records this registration information (e.g., the call or telephone address being registered and the address, such as the network address (e.g., IP address) of the entity or subsystem registering the call address). Call control proxy server 130 records this registration information for agent endpoints 145 and media servers 140 so that server 130 may properly identify incoming calls or call control messages or call signaling messages addressed or directed to specific agent endpoints or media servers 140. Call control proxy server 130 may then register the call addresses or telephone addresses (e.g., telephone numbers) for agent endpoints 145 and media servers 140 with softswitch 125, and specifies to softswitch 125 that call control or signaling messages directed to these call addresses should be forwarded to the call control proxy server 130. Thus, by registering these call addresses, call control proxy server 130 specifies that the telephone addresses for agent endpoints 145 and media servers 140 should be resolved by softswitch 125 to the network address (e.g., IP address, URL) of call control proxy server 130.

The call control proxy server 130 may continue to monitor all call signaling related to (or directed to or from) the agent endpoints 145 and media server 140. Call control proxy server may receive updates as to call status or call state from agent endpoints 145, ACD application 135 and/or media servers 140. Call control proxy server 130 may relay significant call progress events or changes or updates in call status or other information related to calls or the processing of calls to the ACD Application 135 via the internal CTI link 176. ACD application 135 in turn may relay these events and call information to external applications and applications supporting agent endpoints 145 or to other locations via the CTI link 178, for instance.

Media servers 140 may include one or more media servers. Each media server may include, for example, a node with hardware including a processor and memory, signal processing boards, software executing on the node and/or other logic for applying or providing media processing.

Media server 140 may handle a variety of media processing functions that may be used in handling or processing calls. For example, media server 140 may include appropriate software, hardware, media processing boards and/or signal processing logic to process, analyze and generate a variety of media, such as audio, including DTMF (dual-tone, multi-frequency) tones, speech, video, graphics and other media signals. Media server 140 may perform a variety of other functions, such as performing speech recognition, text-to-speech functions and speech-to-text functions, and other media processing. As an example, media server 140 may inject audio messages or tones, video or graphics and the like into calls or media paths (such as RTP sessions). Also, media server 140 may receive and interpret DTMF and speech generated by parties to a call, and may record call audio as required. These are just a few examples of the types of operations media server 140 may perform. While many example calls are described in terms of audio, DTMF tones, speech recognition and the like, calls may also send and receive video and graphics information, pictures, images and the like.

According to an example embodiment, media server 140 may process calls and/or generate media in accordance with one or more standard language media processing scripts. The standard language media processing scripts may be dynamically generated by an application, such as ACD application 135, as may be required in each instance. The media processing script, and/or a pointer to the script or a resource identifier such as a URL identifying the media processing script may be provided to the media server 140. Media server 140 may then process a call and/or generate the appropriate media (audio, DTMF tones, speech, video, graphics, images). Media server 140 may also, for example, process received speech or DTMF tones, process user selections input via computer mouse or other input device and receive and process other user input, etc. in accordance with instructions in the received or identified standard language media processing script.

Media server 140 may process different types of standard language media processing scripts. For example, media server 140 may process standard VoiceXML or SALT scripts to process calls or generate or process media. VoiceXML refers to Voice Extensible Markup Language (VoiceXML), version 1.0, World Wide Web Consortium (W3C), 1999, which is a XML-based language or standard that may be used to create Web content and services that can be accessed over the phone. According to the VoiceXML specification, VoiceXML can be used to create audio dialogs that feature synthesized speech, digitized audio, recognition of spoken and DTMF key input, recording of spoken input, and telephony functions. SALT refers to Speech Application Language Tags (SALT) 1.0 Specification, Jul. 15, 2002, and is considered an extension of HTML which may add a speech and telephony interface to web applications and services, according to the SALT specification.

Agent endpoints 145 may include nodes (e.g., computers), each having appropriate software, for example, for providing packet telephony phones for use by the agents or customer service representatives. The nodes or computers at the agent endpoints 145 may support the individual customer service representatives with packet telephony endpoint capabilities as well as providing call management and administrative interfaces to the ACD application 135. External applications (not shown in FIG. 1) and applications supporting agent endpoints 145 may request specific call actions (for example, the disconnection or transfer of a call) at any time by sending the appropriate request message(s) to ACD application 135 via CTI links 180 and 178, respectively (as examples).

ACD Application 135 may be coupled to call control proxy server 130, for example, via a computer-telephony integration (CTI) link. In some instances, computer-telephony integration (CTI) may refer to the use of computers to manage telephone calls. A CTI link may be provided using an interface, such as, for example, a standards-based interface to allow computers to manage telephone calls using a common or known language. ACD application 135 may also be coupled to agent endpoints 145 via CTI link 178 and to one or more external applications via CTI link 180. ACD application 135 may coordinate the actions of the other subsystems to implement desired ACD call processing capabilities, such as queuing, routing and other call processing functions. According to an embodiment, ACD application 135 may dynamically generate a standard language media processing script, and then provide the script or a pointer or identifier (such as a URL) to the script to media server 140 for executing to apply media to a call.

Throughout the entire process, the ACD application 135 may report the status of one or more (or even all) calls to external applications 180, to agent endpoints 145 (or to applications supporting agent endpoints 145) and other nodes, for example via the CTI links 178 and 180. ACD application 135 may also accept instructions from an external application (not shown) with respect to call control operations. This reporting and instructing may be performed according to an address space and call model that the ACD application 135 may expose to the external applications, which may be different than the actual name space and call model on which the underlying packet telephony network operates. For example, the ACD application may report calls delivered to agents according to their agent identifiers or user names. ACD application 135 may also report calls delivered to agents by the network address of the physical packet telephony endpoint at which the agent is located.

The ACD application 135 may also communicate with call management and administrative functions provided in the agent endpoints or other applications supporting agent endpoints 145, for example to allow customer service agents to declare from time to time that they are ready or not ready to take calls. This communication may also take place indirectly through one or more external applications, which in turn signal the call management and administrative functions through a CTI link to the ACD application 135.

Figure 2:
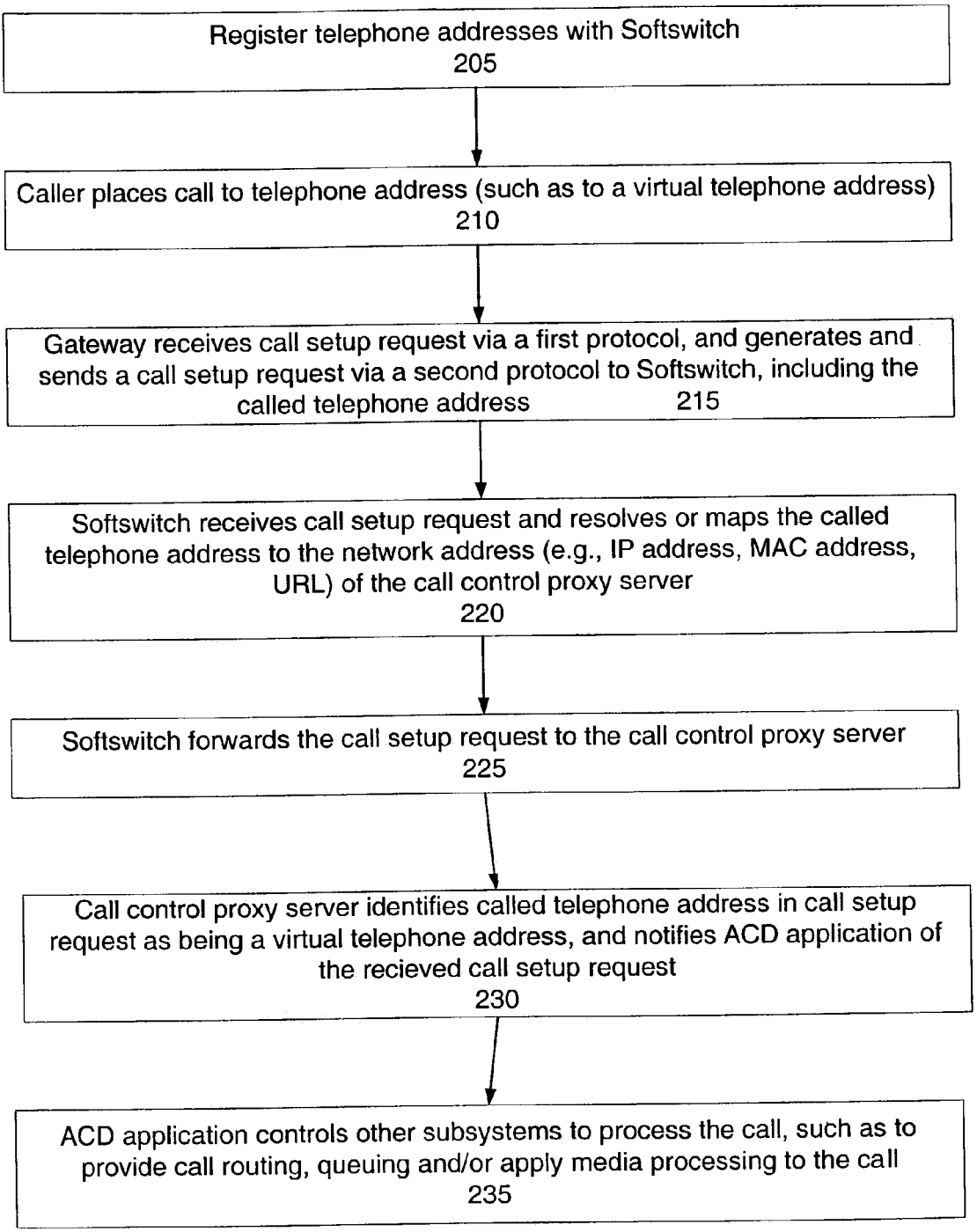
FIG. 2 is a flow chart illustrating an operation of system 100 according to an example embodiment.

FIG. 2 is a flow chart illustrating an operation of system 100 according to an example embodiment. FIG. 2 illustrates various embodiments that may operate (at least in part) in a packet telephony environment, such as a network utilizing the SIP call signaling protocol, H.323 protocol, and/or other protocols.

At 205, various entities or subsystems, such as non-ACD endpoints, agent endpoints, media servers and call control proxy server may register their respective telephone addresses with softswitch 125. A non-ACD endpoint may be an endpoint where further call routing or call distribution is typically not performed. Registration information may include the telephone address that is being registered and the network address (or other address) to which call control messages addressed to the telephone address should be forwarded. Softswitch 125 may generate a lookup table, a database, or other system for resolving or mapping between a registered telephone address and its corresponding network address.

Call control proxy server 130 may register virtual telephone addresses for virtual endpoints (also known as virtual route points). Registration notifies softswitch 125 of the network address (or other address) of call control proxy server 130 and that call control proxy server 130 will handle call control (e.g., call setup, teardown) for calls or messages directed to these registered virtual telephone addresses. In addition, non-ACD endpoints, agent endpoints 145 and media servers 140 may register their respective telephone addresses with softswitch 125 via call control proxy server 130, as described above.

At 210 in FIG. 2, a caller 110 in external (e.g., untrusted) network domain 160 places a call to a telephone address. In this example, the called telephone address may be a virtual telephone address. The call may be, for example, a circuit-switched call placed over the PSTN, or a packet-telephony call. The call is routed through network 115 (which may be the PSTN or the Internet, as examples) and is received at gateway 120

At 215 in FIG. 2, gateway 120 receives the call setup request, which in this example may be a call setup request for a circuit-switched call. Gateway 120 then generates a packet telephony call setup request to Softswitch 125, providing the calling and called telephone addresses. In an embodiment, gateway 120 may receive a call setup request to a telephone address via a first protocol (via network 115), and generates and sends a call setup request via a second protocol (e.g., to call control proxy server 130). For example, the call setup request may be received by gateway 120 via a first protocol that is compatible with PSTN (i.e., a request for a circuit-switch telephone call), while gateway 120 may generate and send a call setup request via a second protocol, such as SIP or H.323, as examples, to setup a corresponding packet-telephony call to the called telephone address. The call setup request may be received by gateway 120 via a first network (such as the PSTN) and via a first protocol, and another call setup request may be generated by gateway 120 and sent over a second network (such as the Internet) and using a second protocol. In general, the first network may be the same as or different from the second network, and the first protocol may be the same as or different from the second protocol. Also, the first network and the second network may be different portions of the same network, such as portions or sections of the Internet.

At 220 in FIG. 2, softswitch 125 receives the call setup request for a packet-telephony call. Softswitch 125 may or may not detect that the call requires ACD functions, such as routing or queuing. Softswitch 125 may resolve the called telephone address, such as a telephone number, to a second address. In an embodiment, softswitch 125 may resolve or map the called telephone number to a network or other address using a database lookup or other technique. In this example, based on a previous registration of this telephone address (telephone number), softswitch 125 resolves or maps the called telephone address to a network address (such as an IP address or other address or resource identifier) of the call control proxy server 130. This is just one example to illustrate an operation of softswitch 125 according to an embodiment.

At 225, softswitch 125 generates and sends a call setup request (e.g., via the second protocol) to the network address of call control proxy server 130, which was identified at 220 (by resolving called telephone address to the network address using a database or other technique). The call setup request may include the called telephone address and other information.

At 230, call control proxy server 130 identifies the incoming call or call setup request as being directed to a virtual telephone address, and may alert or notify the ACD application 135 via the CTI link 176 and awaits further instruction.

At 235, ACD application 135 identifies the virtual telephone address to which the call has been directed and determines the type of ACD processing the call requires. ACD application 135 may then send instructions or messages to control various other subsystems of system 100 to process the call, such as to provide call routing, queuing and/or apply media processing to the received call.

Figure 3:
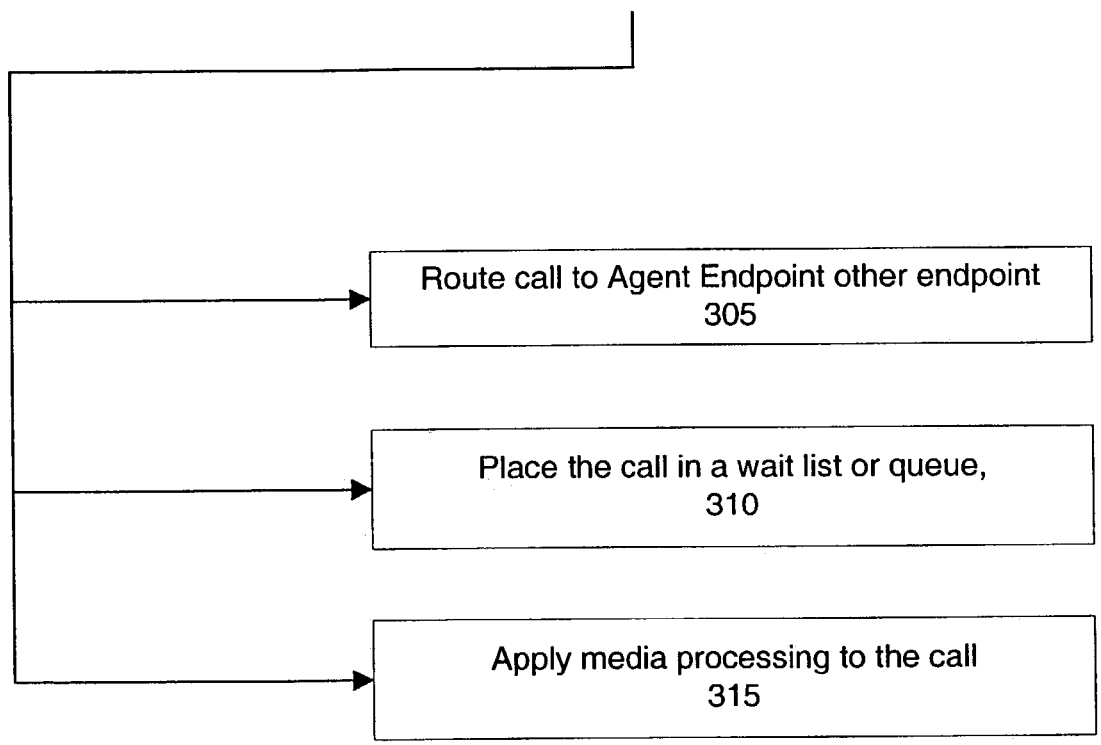
FIG. 3 is a diagram illustrating several examples of call processing that may be performed according to example embodiments.

FIG. 3 is a diagram illustrating several examples of call processing that may be performed according to example embodiments.

Referring to FIG. 3, at 305, ACD application 135 may route the call or control other subsystems to route the call to an endpoint, such as agent endpoints 145 or media server 140. ACD application 135 may route the call based on a variety of different factors, such as pre-configured rules, or may query one or more external applications for further instructions for processing the call. In an example embodiment, the status of agent endpoints may be monitored and used by ACD application 135 to make routing decisions for the call. For example, ACD application 135 may monitor the status of agent endpoints 145 or otherwise receive status information from agent endpoints, via CTI link 178.

Status information from agent endpoints 145 may include any information relating to or describing the status of the agent or the application or node supporting the agent endpoint, information describing any call processing at an agent endpoint or other events occurring at agent endpoints, and the like. Such status information may include information such as: indications of which agents are present or logged into the system, an indication of which agents are presently handling calls and which agents are not, an indication of any specific skills of an agent (e.g., to allow specific calls to be matched to specific agent skills), an indication when an agent has logged in or arrived and can receive a call or has logged out and can no longer receive calls, a request from an agent to receive a specific call or to transfer a specific call, changes or updates to any status, etc.

The mechanics of call routing may include, for example, ACD application 135 signaling server 130 with instructions to forward or route the call to a specific endpoint, and then server 130 sending a call setup message to the endpoint. An example call routing process is described in greater detail with respect to 315.

At 310 in FIG. 3, ACD application 135 may place the incoming call in a wait list or a queue, such as a FIFO (first-in, first-out) queue. This may be done, for example, if no agent is available to handle the incoming call. Rather than a FIFO queue, caller's in the queue may be prioritized for service based on a variety of criteria (e.g., gold card member vs. silver card member).

In an example operation of a call queue, after receiving a notice from call control proxy server 130 via CTI link 176 that a call setup request has been received for a call, the ACD application 135 may query the agent endpoints 145 (or their respective nodes or applications) to determine the status of each agent. If an agent is currently unavailable to handle the incoming call, the call may be placed in a queue to await processing. When an agent becomes available and the call is next in the queue to be handled, ACD application 135 may send a message via CTI link 176 to call control proxy server 130 to setup or establish the incoming call with a specified agent endpoint. ACD application 135 may provide server 130 with the network address of the agent endpoint to receive the call. A call setup message may then be forwarded from call control proxy server 130 via line 177 to the specified agent endpoint 145 with instructions to establish a packet telephony call with gateway 120. The agent endpoint may then send a reply to the call setup request to gateway 120 and establish a packet telephony call between the agent endpoint and gateway 120.

This packet telephony call may be shown in FIG. 1 as an RTP stream 182, for example. By establishing a packet telephony call between gateway 120 and the specified agent endpoint, a call is established between a caller 110 and an agent endpoint 145 via two calls, including a PSTN call (across network 115) and a packet telephony call (across network domain 170), according to this example.

Referring to FIG. 3, at 315, media processing may also be applied to the call. For example, ACD application 135 may require or request one or more of the following:

A message to the caller announcing the call's position in queue;

Music or commercial announcements while the caller waits in queue;

Interaction by DTMF or speech to identify the caller or determine their intention, such as to ask the caller to provide his/her card number or to identify a requested department, etc.; and/or Detection of DTMF or speech signals from the caller, for example, indicating that the caller wishes to be taken out of queue and directed elsewhere.

According to an embodiment, media processing may be applied to the call by the media server 140 under control of ACD application 135.

Figure 4:
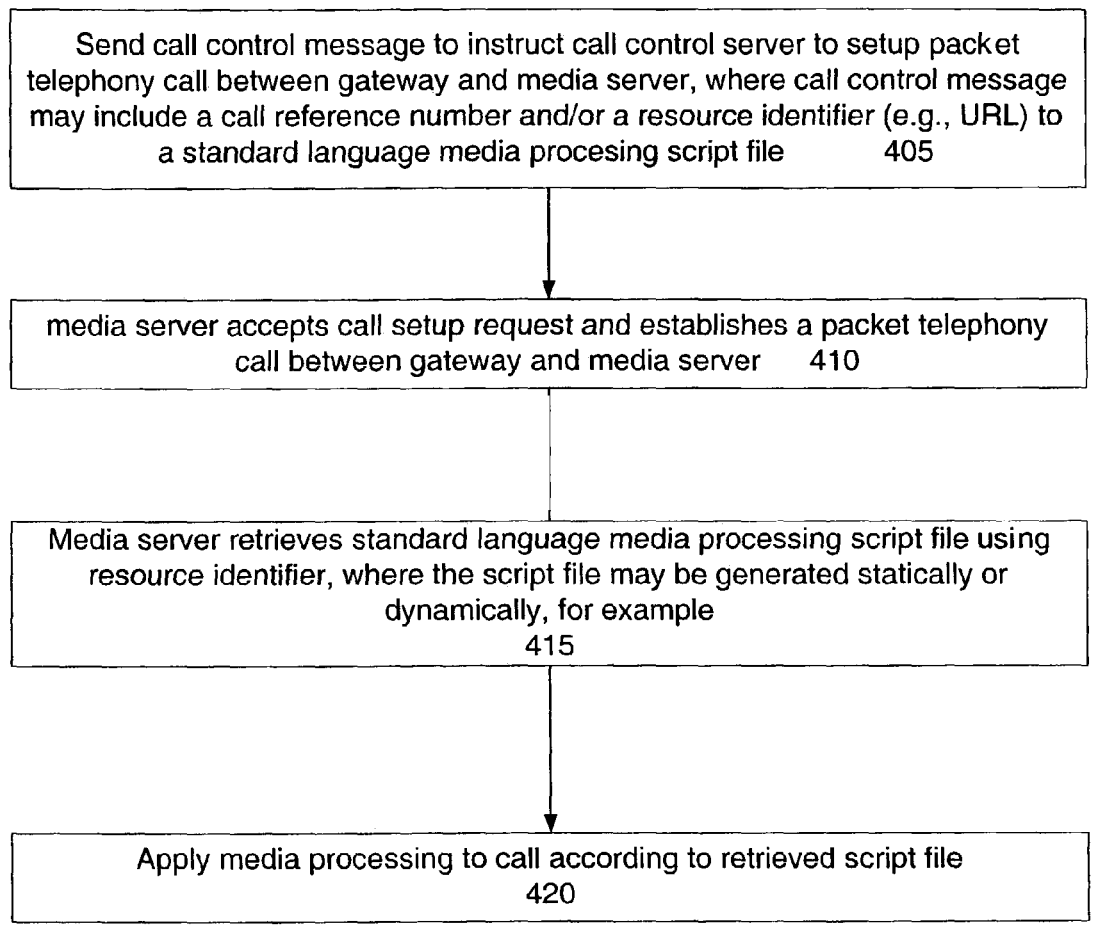
FIG. 4 is a flow chart illustrating an application of media processing to a call according to an example embodiment.

FIG. 4 is a flow chart illustrating an application of media processing to a call according to an example embodiment. In the example embodiment, call control server 130 may have received a call setup message for a call. Server 130 may then send a message via CTI link 176 to notify ACD application 135 of the received call (or call setup request) and to request routing or call processing instructions for the call. The message from call control proxy server may include a call reference number to identify the call, the called telephone address (e.g., telephone number), the caller's telephone number, and other information. The call reference number (or call identifier) may be a number or identifier that is associated with or otherwise may identify the call.

Referring to FIG. 4, ACD application 135 may determine that media processing should be applied to the incoming call. Therefore, at 405, ACD application may send a message to call control proxy server 130 instructing server 130 to extend or set up the call from gateway 120 to a port on media server 140. The message from ACD application may include the call reference number (or call identifier) to identify the call and the network address of media server 14, and a port number for routing the call. Call control proxy server 130 may match the call reference number to the call reference numbers in a database of active calls it may maintain. Call control server 130 may then send a call setup message for the call to media server 140, and may specify the port number and call reference number.

The call setup message to media server 140 may also include a standard language media processing script file within the message. The script file may alternatively be sent in a separate message. Alternatively, rather than including the script file within the call setup message from ACD 135 application, the call setup message may include a pointer or resource identifier (such as a URL) to the media processing script file. The media processing script file may provide instructions as to the media that should be applied to the call or for processing the call.

At 410 in FIG. 4, media server 140 accepts the call setup request and establishes a packet telephony call between gateway 120 and media server 140. This may be accomplished, for example, by media server sending a reply to the call setup request to gateway 120, and thereby establishing a packet telephony call between gateway 120 and itself. Thus, in one embodiment, a caller 110 may be connected to media server 140 across two networks, where the two networks may use different protocols. In an example embodiment shown in FIG. 1, a caller 110 is coupled to media server 140 via a circuit-switched telephone call over network 115 to gateway 120, and then connected via a packet telephony call from gateway 120 to media server 140.

At 415 in FIG. 4, media server 140 may retrieve a script file, such as a standard language media processing script file using the resource identifier or URL. As noted, the call setup message may include an identifier, such as a URL that identifies a standard language media processing script file. The identifier or URL may identify or resolve to a script file that is stored on or within ACD application 135, stored on a storage device (not shown) that is coupled to ACD application 135, or stored on another node or server. According to an embodiment, media server 140 may retrieve the standard language media processing script file, for example, using an HTTP Get function via line 186. This identified standard language media processing script file may include one or more instructions to apply media processing to the call or otherwise process the call.

According to an embodiment, the resource identifier or URL specified by media server 140 may contain unique information so that the ACD application 135 may determine which call this HTTP GET request pertains to, even though it may not know the specific media port on the Media Server where the call was directed. This unique or identifying information may be, for example, the call reference number of the subject call or the unique URL specified by the ACD application when it instructed the call processing proxy server 130 to extend the call to the media server 140.

ACD application 135 (or other node) may reply to the Get function or other information retrieval request with the identified script file. Many different techniques can be used to provide a media processing script file. For example, rather than using a URL or resource identifier received via a call control message, media server 140 may instead use predetermined identifiers or URLs (or predetermined script files) for calls arriving at certain signaling (or network) addresses or arriving at certain media ports of media server 140, or for calls having certain characteristics. For example, calls to the sales department of a call center or business may be routed to a first network address or a first port of media server 140, while calls to the service department may be routed to a second network address or to a second port of media server 140. This may be done using different dialed telephone numbers, or by querying the caller for a selection using DTMF tones or speech input. For example, media server 140 may automatically retrieve a script file identified by a first predetermined URL for calls received at the first network address or first port (e.g., using a first script file to handle calls to the sales department), and may retrieve a script file identified by a second predetermined URL for calls received at the second network address or second port of media server 140 (e.g., using a second script file to handle calls to the service department).

In addition, media server 140, may construct or generate a resource identifier or URL, for example, based upon properties of the call such as the call reference number including in the call control message or other call information.

In another embodiment, a media processing script file may be dynamically generated (e.g., by ACD application 135 or other server from which the script file is requested) to allow a custom script to be generated in real-time or dynamically based on current call status or information related to the call or caller or other information. For example, ACD application 135 may generate a script based on one or more properties of the call (such as a dialed telephone number), the time of day, the number of other calls in the queue, or by querying the caller for information. For example, the media server 140 may initially generate a message requesting the caller to say the name of or identify the department they are calling (e.g., sales, service, returns, installation). Media server 140 may provide some or all of this information (e.g., dialed telephone number and requested department) to ACD application 135. ACD application 135 may then dynamically generate a custom media processing script file based on this information. This dynamically generated custom script file may be specifically tailored to or based upon the current status of the call or caller or other current information related to the call. The media server 140 may then retrieve or obtain the dynamically generated media processing script file for this call from ACD application 135 using the URL and then apply the media processing to the call according to the script file.

In one example embodiment, media server 140 may execute or retrieve an initial (or default) script file that causes the media server to ask the caller to input his credit card number, for example. The initial script may include one or more instructions that links or chains to another (or second) URL or script based on whether the caller is a silver card or a gold card member, as examples, to perform additional media processing on the call. These second scripts may provide different levels of service or different types of media processing based on the caller's input (e.g., caller's card number), for example, based on whether the caller is a silver card or gold card member.

Referring to 420 in FIG. 4, after retrieving the media processing script file, media server 140 may then apply media processing to the call according to the instructions in the script file. For example, ACD application 135 may reply to the HTTP GET operation with a dynamically created script file that causes media server 140 to execute the desired media processing operations. As noted above, in an embodiment, such a media processing script may be provided in a standard language, such as Voice XML or SALT, as examples.

For example, in dynamically creating or generating a media processing script file, the ACD application 135 may perform a database query using the previously entered credit card number, for example, to obtain credit card balance, last payment, etc. The ACD application 135 may also perform a number or calculations, such as determining the call's number or position in the queue and the call's estimated wait time. ACD application 135 may alternatively forward the entered credit card number to an external application where a customer database is located, and then receive the credit card balance and last payment information from the external application. ACD application 135 may then dynamically generate or create a media processing script file including instructions that will instruct media server 140 to do the following, for example: to announce the caller's credit card balance, the amount of the last payment, the number in the call queue and estimated waiting time before an agent will handle the call, followed by 30 seconds of music. This is just one example that illustrates how ACD application 135 may dynamically generate a media processing script file, such as a standard language (or standards-based) media processing script file.

A call reference number provided by media server to identify the call may be used to identify and retrieve caller information previously input by the caller, such as the caller's card number. The standard language media processing script file that may have been dynamically generated by ACD application 135 may then be forwarded to the media server 140 in response to the HTTP Get operation. A final instruction in such a script may be, for example, a request to chain or link to yet another URL, which causes the media server to fetch a second media processing script file from ACD application 135 or other location. This second media processing script file may again be dynamically created, thus providing the latest update on queue position and wait time, or other media processing, for example. The second media processing script file may include an instruction to chain to (or retrieve) a third media processing script file, where further information may be provided to the caller. This chaining or linking process (e.g., linking to successive script files) could continue until the call was released from the queue. The script could also include instructions for the media server 140 to listen for or detect predetermined DTMF signals or speech input from the caller. If media server 140 detects such predetermined signals or input (e.g., caller response), the media server 140 may forward the question and caller input or response (e.g., DTMF signals or voice signals from the caller) via an HTTP POST method, for instance. The ACD application 135 may then generate an additional media processing script including instructions to forward the call to a specific agent or to apply other media processing to the call based on the caller's input. This additional script file may then be sent to the media server to perform the call processing specified by the media processing script file.

As another example, a first media processing script file used by the media server 140 may include instructions for the media server 140 to prompt the caller as to whether they were trying to reach Sales or Product Support. After receiving the caller's input or response (e.g., as either voice or DTMF signals), media server 140 may then return the caller's DTMF or interpreted speech input to the ACD application 135 via an HTTP POST method or other message. ACD application 135 may then use this caller response to dynamically generate a second media processing script file for the call. The URL to this second script file (or the second script file itself) may then be sent to media server 140, via a HTTP Post method or other message. Media server 140 may retrieve the second media processing script file and then apply media processing to the call as instructed by this second script file. For example, the second script file may include instructions to prompt the caller for additional information, and then forward the call to a specific agent, to place the call in a queue or to perform other call processing based on one or more responses from the caller.

According to an embodiment, when the ACD application 135 determines that a call is ready to be routed or released from a queue and routed to an agent or other location, the ACD application 135 may instruct the call control proxy server 130 to signal the media server 140 to disconnect the RTP streams for the call and redirect the call signaling and the associated RTP streams to the desired address.

A number of variations may be applied to the various embodiments described above. For example, while some call processing functions have been described, a variety of other call processing functions typically offered by traditional circuit-switched telephony ACDs, such as call recording, can be implemented by ACD application 135 and/or media server 140. In addition, the various subsystems described above may be provided in multiple copies for redundancy, to provide additional call processing power or bandwidth or throughput. For example, the various systems described above may operate with multiple gateways 120, multiple soft switches, multiple call control proxy servers 130 and multiple media servers 140. While the various embodiments have been described above with reference to several exemplary protocols such as SIP, H.323, HTTP and others, a variety of other protocols may be used as well.

While ACD application 135 may control or coordinate various aspects of call processing, call processing may be controlled or coordinated from other nodes or subsystems as well. For example, the agent endpoint 145 or application software in support of such an endpoint may instruct the media server 140 in the same manner that the ACD application 135 instructs the media server. For example, if an agent endpoint 145 requires the audio stream of a call to be recorded, that endpoint can instruct the call control proxy server 130 to extend a leg of the call to the media server 140, and can then supply an appropriate media processing script via line 187 to the media server 140 that will cause the call to be recorded. The agent endpoint 145 or supporting application software may instruct the call control proxy server 130 via line 177 and may receive status and event information from that Server via the CTI link 178 as shown in FIG. 1.

In some embodiments, some subsystems may be combined or eliminated altogether. According to an embodiment, use of the media server 140 may be eliminated. Media server 140 may be eliminated, for example, in cases where the caller is using a device (e.g., computer) that is capable of interpreting and/or processing standard language media processing scripts, such as SALT scripts or VoiceXML scripts, as examples. For example, a caller may make a call from a computer that includes appropriate hardware, such as speech processing boards, graphics boards, and/or appropriate software for interpreting and rendering standard language media processing scripts. The caller's computer may interpret various instructions in a standard language media processing script file, and may then render or generate the media (e.g., display graphics and video, generate audio or speech through speakers, query the caller, etc.) to the caller according to the instructions in the media processing script file. In such a case, a caller's node (or calling node) may be able to place a call (e.g., packet telephony call) and apply or generate local media processing to the call according to instructions from a standard language media processing script file retrieved from ACD 135 by the caller's node. In this manner, the caller's node or computer may locally generate media (e.g., voice, audio, video graphics, text) to the caller according to a retrieved script file, rather than relying on a remote media server to apply media processing or generate media that is sent back to the caller over a network.

For example, the standard language media processing script file may be a Voice XML script or a SALT script that causes such a node to: generate or interpret speech or other audio, interpret DTMF signals from the caller, generate a video or graphics display to the caller to request information, and apply other media processing to the caller. In such an embodiment, various inputs or responses, such as speech or DTMF signals or a mouse click to make a selection from a display, may be received by the caller node and then forwarded to ACD application 135.

For example, if the caller is using a personal computer equipped with a multimedia web browser capable of interpreting SALT-based web pages, the ACD application 135 may cause an appropriate SALT-based web page to be sent directly to that device instead of extending the call to a media server 140 and directing the media server to interpret the SALT-based web page.

If the caller is known to be using a device capable of displaying graphic or mixed-mode (such as, for example, speech/audio and graphics/video) web pages, the ACD application 135 may cause appropriate web pages to be sent to that device to communicate information in a graphic or mixed graphic/speech mode. For example, instead of instructing the Media Server to ask the caller for an account number, the ACD application 135 may (1) send a graphic web page to the caller's device requesting the entry of the account number or (2) send a multi-mode web page that would permit either form of information entry depending on the caller's preference (e.g., either keyed or mouse entry of account number, or speech input of account number). The keyed input or speech input may then be recorded and sent back to ACD 135 where the caller's response would be analyzed, and then additional web pages sent to the caller.

In another example, ACD application 135 may send a series of periodically updated graphic web pages to the caller's device showing the caller's position in queue and expected waiting time, providing graphic click buttons through which the caller could ask to exit the queue and be served in some other way.

The embodiment described above with reference to FIG. 4 may establish the packet telephony call between the caller and a media server 140. Media server 140 may then apply media processing to the call, for example, in accordance with a media processing script. The media (e.g., voice, speech, video, graphics, web pages) may be generated by the media server 140 and sent to the caller over a network (e.g., network domain 170 and/or network 115). The embodiment of FIG. 5 may use a slightly different approach where media may be locally generated by a caller's node (or computer), rather than relying on media server 140 to generate the media.

Figure 5:
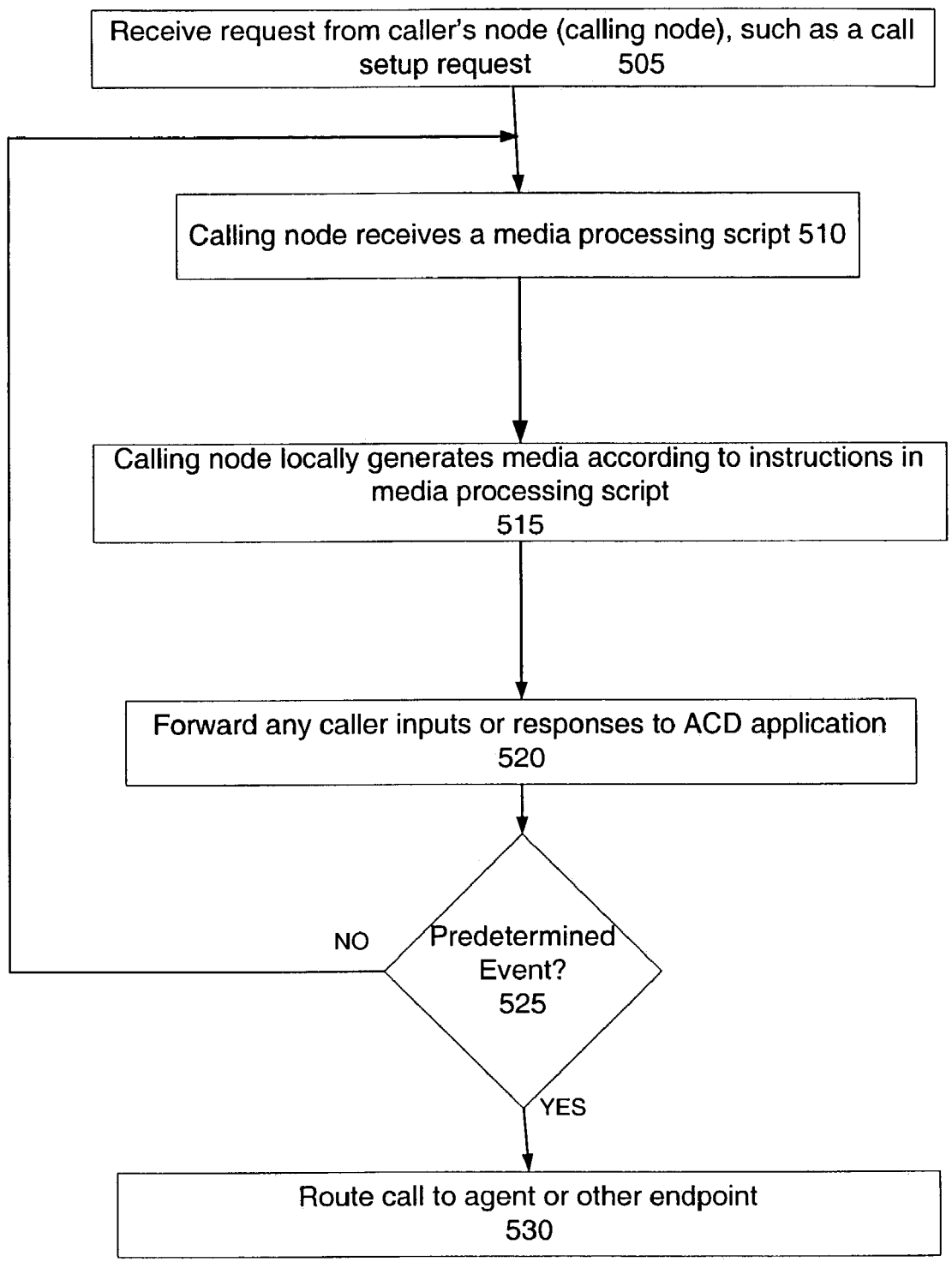
FIG. 5 is a flow chart illustrating operation of a system according to another example embodiment.

FIG. 5 is a flow chart illustrating operation of a system according to another example embodiment. A caller may initiate a call. At 505, a call setup request may be received at call control proxy server 130, for example. Proxy server 130 may notify ACD application of receipt of the call (or call setup request) via CTI link 176. The call may or may not be placed in a queue.

At 510, the calling node (or caller's computer) may retrieve or receive a standard language media processing script from ACD application 135 or other node. According to an embodiment, software or other logic may be provided on the calling node that is capable of interpreting standard language media processing scripts and generating media according to those scripts.

At 515, the calling node may generate media to the caller (e.g., generate audio or speech signals, video, graphics and/or web pages to the caller) according to instructions in the received media processing script. The calling node may also receive and forward any caller input or response to ACD application 135. In addition, the media processing script may include one or more URLs or links to other media processing scripts that cause the calling node to retrieve or chain to a subsequent media processing script.

At 520, according to an embodiment, flow may proceed to 530 if a predetermined event is detected by either the calling node or ACD application 135. If a predetermined event is not detected, flow may proceed back to 510 where another media processing script may be retrieved, and then blocks 515 and 520 may be repeated for that media processing script.

The predetermined event may be, for example: 1) an agent becomes available for processing the call and the call is then routed to the agent endpoint; 2) the calling node receiving a predetermined response or input from the caller (such as a request for transfer to a specific department or agent); and/or 3) instructions from ACD 135 to terminate the local generation of media and/or to establish or route the call to another endpoint such as an agent endpoint. These are just some example events, but a wide variety of events may cause the flow to proceed to 530.

At 530, in response to detecting a predetermined event, the call may be routed to an agent endpoint or other endpoint. As an example, a caller may select or request transfer to the service department. This input or request may then be forwarded to ACD application 135. ACD application 135 may then send a message to calling node instructing the calling node to terminate the local generation of media, and the ACD application instructs call control proxy server 130 to route or establish the call to agent endpoint 145 (corresponding to the original call setup request).

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. An automatic call distributor (ACD) system to perform call processing for packet telephony calls, the ACD system comprising:
   a call control proxy subsystem interposed between a softswitch and one or more other subsystems or endpoints, the call control proxy subsystem to register telephone addresses of the one or more other subsystems or endpoints with the softswitch and to handle call control for packet telephony calls received by the softswitch on behalf of the one or more other subsystems or endpoints, the call control proxy subsystem to receive call setup requests for incoming packet telephony calls from the softswitch at a network address translated from telephone addresses of the one or more subsystems or endpoints by the softswitch;
   an ACD application distinct from the call control proxy subsystem and the softswitch and coupled to the call control proxy subsystem and the one or more other subsystems or endpoints via computer-telephony integration (CTI) links, the ACD application to determine required ACD processing for incoming packet telephony calls in response to receiving notifications of the incoming packet telephony calls or the call setup requests from the call control proxy subsystem and to dynamically generate standard language media processing scripts prior to call setup with the one or more other subsystems or endpoints to control or coordinate call processing for the packet telephony calls; and
   a media subsystem coupled to the ACD application to generate media prior to call setup with the one or more other subsystems or endpoints, wherein the media subsystem comprises a media server to generate media according to instructions in a media processing script provided by the ACD application.

2. The ACD system of claim 1 wherein the ACD application comprises an ACD application to generate standard language media processing scripts to control the generation of media or other call processing for calls.

3. The ACD system of claim 1 wherein the ACD application is coupled to the media subsystem via a standards based communications interface.

4. The ACD system of claim 3 wherein the standards based communications interface supports one or more of a computer-telephony integration (CTI) link, one or more standard protocols and standard language media processing scripts.

5. The ACD system of claim 1 wherein the call control proxy subsystem comprises a proxy server.

6. An automatic call distributor (ACD) system to perform call processing for packet telephony calls, the ACD system comprising:
   an ACD application to dynamically generate standard language media processing scripts to control or coordinate call processing for packet telephony calls;
   a call control proxy subsystem interposed between a softswitch and one or more other subsystems or endpoints, the ACD application distinct from the call control proxy subsystem and the media subsystem and coupled to the call control proxy subsystem and the one or more other subsystems or endpoints via computer-telephony integration (CTI) links, the call control proxy subsystem to register telephone addresses of the one or more other subsystems or endpoints with the softswitch and to handle one or more call control functions for packet telephony calls received by the softswitch based on instructions from the ACD application, the call control proxy subsystem to receive call setup requests for incoming packet telephony calls from the softswitch at a network address translated from telephone addresses of the one or more subsystems or endpoints by the softswitch, the ACD application to determine required ACD processing for incoming packet telephony calls in response to receiving notifications of the incoming packet telephony calls or the call setup requests from the call control proxy subsystem, the ACD application to dynamically generate standard language media processing scripts prior to call setup with the one or more other subsystems or endpoints;
   a media subsystem coupled to the ACD application to generate media prior to call setup with the one or more other subsystems or endpoints, wherein the media subsystem comprises a media server to generate media according to instructions in a media processing script provided by the ACD application.

7. The ACD system of claim 6 wherein the standard language media processing scripts may each include one or more instructions to generate or apply media including one or more of audio, speech, video, graphics, and web pages.

8. The ACD system of claim 6 wherein the ACD application comprises an ACD application to dynamically generate standard language media processing scripts based on current call status or information related to the call or caller.

9. An apparatus comprising an automatic call distributor (ACD) application, the ACD application to control or coordinate call processing for packet telephony calls, the ACD application to dynamically generate a standard language media processing script prior to call setup with one or more other subsystems or endpoints, the script being used by another device or subsystem to apply media processing to a call or caller, the ACD application to be coupled to a call control proxy subsystem interposed between a softswitch and the one or more other subsystems or endpoints, the ACD application distinct from the call control proxy subsystem and the softswitch and coupled to the call control proxy subsystem and the one or more other subsystems or endpoints via computer-telephony integration (CTI) links, the call control proxy subsystem to register telephone addresses of the one or more other subsystems or endpoints with the softswitch and to handle call control for packet telephony calls received by the softswitch on behalf of the one or more other subsystems or endpoints, the call control proxy subsystem to receive call setup requests for incoming packet telephony calls from the softswitch at a network address translated from telephone addresses of the one or more subsystems or endpoints by the softswitch, the ACD application to determine required ACD processing for incoming packet telephony calls in response to receiving notifications of the incoming packet telephony calls or the call setup requests from the call control proxy subsystem; and a media subsystem coupled to the ACD application to generate media prior to call setup with the one or more other subsystems or endpoints, wherein the media subsystem comprises a media server to generate media according to instructions in a media processing script provided by the ACD application.

10. The apparatus of claim 9 wherein the ACD application may communicate with the call control proxy subsystem and a media subsystem via one or more standards-based communication techniques.

11. The apparatus of claim 10 wherein the standards-based communication techniques may include one or more of a standards-based CTI link, one or more standard protocols and standard language media processing scripts.

12. The apparatus of claim 9 the call control proxy subsystem to handle one or more call control functions based on instructions from the ACD application.

13. An apparatus comprising an automatic call distributor (ACD) application to dynamically generate media processing scripts prior to call setup with one or more other subsystems or endpoints to control or coordinate call processing for packet telephony calls, a call control proxy subsystem interposed between a softswitch and the one or more other subsystems or endpoints, the ACD application distinct from the call control proxy subsystem and the softswitch and coupled to the call control proxy subsystem and the one or more other subsystems or endpoints via computer-telephony integration (CTI) links, the call control proxy subsystem to register telephone addresses of the one or more other subsystems or endpoints with the softswitch and to handle one or more call control functions for packet telephony calls received by the softswitch on behalf of the one or more other subsystems or endpoints based on instructions from the ACD application, the call control proxy subsystem to receive call setup requests for incoming packet telephony calls from the softswitch at a network address translated from telephone addresses of the one or more subsystems or endpoints by the softswitch, the ACD application to determine required ACD processing for incoming packet telephony calls in response to receiving notifications of the incoming packet telephony calls or the call setup requests from the call control proxy subsystem, and a media subsystem to generate media to calls based on instructions from the ACD application, the ACD application communicating with the call control proxy subsystem and the media subsystem via one or more standards-based communication techniques; and a media subsystem coupled to the ACD application to generate media prior to call setup with the one or more other subsystems or endpoints, wherein the media subsystem comprises a media server to generate media according to instructions in a media processing script provided by the ACD application.

14. The apparatus of claim 13 wherein the standards-based communication techniques may include a standards-based CTI link, one or more standard protocols and standard language media processing scripts.

15. The apparatus of claim 13 wherein the ACD application comprises an ACD application to dynamically generate a media processing script that may be used by the media subsystem to apply media to a call.

16. An automatic call distributor (ACD) application to control or coordinate call routing and queuing for packet telephony calls, the ACD application receiving call status information from at least one of a call control proxy subsystem and an agent endpoint, the call control proxy subsystem interposed between a softswitch and one or more other subsystems or endpoints, the ACD application distinct from the call control proxy subsystem and the softswitch and coupled to the call control proxy subsystem and the one or more other subsystems or endpoints via computer-telephony integration (CTI) links, the call control proxy subsystem to register telephone addresses of the one or more other subsystems or endpoints with the softswitch, the call control proxy subsystem to receive call setup requests for incoming packet telephony calls from the softswitch at a network address translated from telephone addresses of the one or more subsystems or endpoints by the softswitch, the ACD application to determine required ACD processing for incoming packet telephony calls in response to receiving notifications of the incoming packet telephony calls or the call setup requests from the call control proxy subsystem, the ACD application controlling the call control proxy subsystem to route one or more calls, the ACD application to dynamically generate a media processing script prior to call setup with the one or more other subsystems or endpoints that identifies media to be applied to a call; and a media subsystem coupled to the ACD application to generate media prior to call setup with the one or more other subsystems or endpoints, wherein the media subsystem comprises a media server to generate media according to instructions in a media processing script provided by the ACD application.

17. The ACD application of claim 16 wherein the media processing script generated by the ACD application comprises a standard language media processing script that is provided to a media subsystem or other node or subsystem to generate or apply media to a call according to instructions in the media processing script.

18. An ACD application to control or coordinate routing, queuing and other call processing of packet telephony calls, the ACD application to receive information relating to a call from a call control proxy subsystem, the call control proxy subsystem interposed between a softswitch and one or more other subsystems or endpoints, the ACD application distinct from the call control proxy subsystem and the softswitch and coupled to the call control proxy subsystem and the one or more other subsystems or endpoints via computer-telephony integration (CTI) links, the call control proxy subsystem to register telephone addresses of the one or more other subsystems or endpoints with the softswitch, the call control proxy subsystem to receive call setup requests for incoming packet telephony calls from the softswitch at a network address translated from telephone addresses of the one or more subsystems or endpoints by the softswitch, the ACD application to determine required ACD processing for incoming packet telephony calls in response to receiving notifications of the incoming packet telephony calls or the call setup requests from the call control proxy subsystem, the ACD application to dynamically generate a standard language media processing script prior to call setup with the one or more other subsystems or endpoints based on the information; and a media subsystem coupled to the ACD application to generate media prior to call setup with the one or more other subsystems or endpoints, wherein the media subsystem comprises a media server to generate media according to instructions in a media processing script provided by the ACD application.

19. The ACD application of claim 18 wherein the ACD application comprises an ACD application to receive status information from the endpoints.

20. The ACD application of claim 18 wherein the ACD application may provide the generated standard language media processing script to a media subsystem to apply media to the call.

21. A media subsystem to generate media to a packet telephony call in accordance with a standard language media processing script, the media subsystem coupled to an ACD application through a call control proxy subsystem, the call control proxy subsystem interposed between a softswitch and one or more other subsystems or endpoints, the ACD application distinct from the call control proxy subsystem and the softswitch and coupled to the call control proxy subsystem and the one or more other subsystems or endpoints via computer-telephony integration (CTI) links, the ACD application to dynamically generate a standard language media processing script prior to call setup with the one or more other subsystems or endpoints, the call control proxy subsystem to register telephone addresses of the one or more other subsystems or endpoints with the softswitch and to handle call control for packet telephony calls received by the softswitch on behalf of the one or more other subsystems or endpoints, the call control proxy subsystem to receive call setup requests for incoming packet telephony calls from the softswitch at a network address translated from telephone addresses of the one or more subsystems or endpoints by the softswitch, the ACD application to determine required ACD processing for incoming packet telephony calls in response to receiving notifications of the incoming packet telephony calls or the call setup requests from the call control proxy subsystem, the media subsystem receiving the standard language media processing script from the ACD application and generating media in accordance with the script prior to call setup with one or more other subsystems or endpoints, the media being communicated across a network to a caller or calling node.

22. The media subsystem of claim 21 wherein the media subsystem may generate media in accordance with the standard language media processing script, the media being one or more of audio, speech, video, graphics, and web pages.

23. An apparatus comprising logic or software to receive a standard language media processing script from a subsystem via a network, the apparatus to locally generate media to a caller or call party in accordance with instructions in the media processing script prior to call setup with one or more other subsystems or endpoints, the subsystem comprising an ACD application coupled to a call control proxy subsystem, the call control proxy subsystem interposed between a softswitch and one or more other subsystems or endpoints, the call control proxy subsystem to register telephone addresses of the one or more other subsystems or endpoints with the softswitch and to handle call control for packet telephony calls received by the softswitch on behalf of the one or more other subsystems or endpoints, the ACD application distinct from the call control proxy subsystem and the softswitch and coupled to the call control proxy subsystem and the one or more other subsystems or endpoints via computer-telephony integration (CTI) links, the call control proxy subsystem to receive call setup requests for incoming packet telephony calls from the softswitch at a network address translated from telephone addresses of the one or more subsystems or endpoints by the softswitch, the ACD application to determine required ACD processing for incoming packet telephony calls in response to receiving notifications of the incoming packet telephony calls or the call setup requests from the call control proxy subsystem, the ACD application to dynamically generate standard language media processing scripts prior to call setup to control or coordinate call processing for packet telephony calls.

24. The apparatus of claim 23 wherein the apparatus may detect caller inputs or signals and forward the caller inputs or signals to the subsystem.

25. The apparatus of claim 23 wherein the media processing script may include one or more instructions that cause the apparatus to retrieve or obtain a second standard language media processing script, the apparatus to locally generate additional media based on the second media processing script.

26. An apparatus comprising a call control proxy subsystem coupled to an ACD application, a media subsystem, and a softswitch, the ACD application distinct from the call control proxy subsystem and the softswitch and coupled to the call control proxy subsystem and the one or more other subsystems or endpoints via computer-telephony integration (CTI) links, the ACD application to dynamically generate standard language media processing scripts prior to call setup with the one or more other subsystems or endpoints to control or coordinate call processing for packet telephony calls, the apparatus to register telephone addresses with the softswitch on behalf of virtual endpoints or other subsystems, the apparatus to provide call information to the ACD application regarding packet telephony calls or call requests, the call control proxy subsystem to receive call setup requests for incoming packet telephony calls from the softswitch at a network address translated from telephone addresses of the one or more subsystems or endpoints by the softswitch, the ACD application to determine required ACD processing for incoming packet telephony calls in response to receiving notifications of the incoming packet telephony calls or the call setup requests from the call control proxy subsystem, and the apparatus to control at least some call routing functions based on instructions from the ACD application, the media subsystem coupled to the ACD application to generate media prior to call setup with the one or more other subsystems or endpoints, wherein the media subsystem comprises a media server to generate media according to instructions in a media processing script provided by the ACD application.

27. The apparatus of claim 26 wherein the apparatus comprises a call control proxy server.

28. A method of processing for packet telephony calls, the method comprising:

receiving information regarding a call or call request from a call control proxy subsystem at an automatic call distributor (ACD) application, the call control proxy subsystem interposed between a softswitch and one or more other subsystems or endpoints, the ACD application distinct from the call control proxy subsystem and the softswitch and coupled to the call control proxy subsystem and the one or more other subsystems or endpoints via computer-telephony integration (CTI) links, the call control proxy subsystem to register telephone addresses of the one or more other subsystems or endpoints with the softswitch and to handle call control for packet telephony calls received by the softswitch on behalf of the one or more other subsystems or endpoints, the call control proxy subsystem to receive call setup requests for incoming packet telephony calls from the softswitch at a network address translated from telephone addresses of the one or more subsystems or endpoints by the softswitch, the ACD application to determine required ACD processing for incoming packet telephony calls in response to receiving notifications of the incoming packet telephony calls or the call setup requests from the call control proxy subsystem;

dynamically generating a media processing script at the ACD application prior to call setup with the one or more other subsystems or endpoints based on the information;

sending the media processing script to a media subsystem;

the media subsystem generating or applying media to the call, prior to call setup with one or more other subsystems or endpoints, in accordance with instructions in the media processing script.

29. The method of claim 28 wherein the media processing script is a standard language media processing script and wherein the information regarding the call or call request is provided by the call control proxy subsystem via a standards-based communication technique.

30. The method of claim 29 wherein the standards-based communication technique may be one or more of a standards-based CTI link and a standard protocol.

31. The method of claim 28 wherein the media subsystem generating or applying media comprises the media subsystem generating or applying media to the call in accordance with instructions in the media processing script, the media comprising one or more of audio, speech, video, graphics, and web pages.

32. The method of claim 28 wherein media processing script also includes one or more instructions that cause the media subsystem to retrieve a second media processing script, the media subsystem using the second media processing script to generate or apply additional media to the call, both said first and second media processing scripts comprising standard language media processing scripts.

33. A method of processing packet telephony calls comprising:

registering one or more telephone call addresses for a virtual endpoint or for one or more subsystems at a softswitch;

receiving a call setup request;

resolving a call address in the setup request to a call control proxy subsystem address based on said registering, the call control proxy subsystem interposed between the softswitch and the virtual endpoint or the one or more subsystems, the call control proxy subsystem to handle call control for packet telephony calls received by the softswitch on behalf of the virtual endpoint or one or more other subsystems;

sending the call setup request to the call control proxy subsystem address;

notifying an ACD application of receipt of the call setup request, the ACD application distinct from the call control proxy subsystem and the softswitch and coupled to the call control proxy subsystem and the one or more other subsystems or endpoints via computer-telephony integration (CTI) links, the ACD application to determine required ACD processing for incoming packet telephony calls in response to receiving notification of the call setup request from the call control proxy subsystem;

establishing a call for the received call setup request with a media subsystem;

dynamically generating a standard language media processing script at the ACD application prior to call setup with the one or more other subsystems or endpoints;

sending the standard language media processing script to the media subsystem;

the media subsystem applying or generating media to the call, prior to call setup with the one or more other subsystems or endpoints, in accordance with one or more instructions in the media processing script.

34. A method of processing packet telephony calls comprising:

registering one or more telephone call addresses for a virtual endpoint of an ACD system at a softswitch;

receiving a call setup request;

resolving a call address in the setup request to a call control proxy subsystem address based on said registering, the call control proxy subsystem interposed between the softswitch and the virtual endpoint, the call control proxy subsystem to handle call control for packet telephony calls received by the softswitch on behalf of the virtual endpoint;

sending the call setup request to the call control proxy subsystem address;

receiving instructions from an ACD application for the call, the ACD application distinct from the call control proxy subsystem and the softswitch and coupled to the call control proxy subsystem and the one or more other subsystems or endpoints via computer-telephony integration (CTI) links, the ACD application to determine required ACD processing for incoming packet telephony calls in response to receiving notification of the call setup request from the call control proxy subsystem, the ACD application dynamically generating a standard language media processing script comprising the instructions prior to call setup with the one or more other subsystems or endpoints;

processing the call based on the instructions; and generating media according to instructions in a media processing script provided by the ACD application by a media subsystem coupled to the ACD application to generate media prior to call setup with the one or more other subsystems or endpoints, wherein the media subsystem comprises a media server.

35. The method of claim 34 wherein said processing comprises performing one or more of the following based on the instructions for the call:

routing the call to an endpoint;

placing the call in a queue; and applying media to the call.

36. The method of claim 35 wherein the applying media to the call comprises:

the ACD application dynamically generating a standard language media processing script;
routing or establishing the call to a media subsystem;
sending the media processing script to the media subsystem; and
the media subsystem applying or generating media to the call based on the media processing script.

37. A method of processing packet telephony calls comprising:
receiving a call setup request via a standard protocol at a call control proxy subsystem interposed between a softswitch and one or more other subsystems or endpoints, the call control proxy subsystem to register telephone addresses of the one or more other subsystems or endpoints with the softswitch and to handle call control for packet telephony calls received by the softswitch on behalf of the one or more other subsystems or endpoints, the call control proxy subsystem to receive call setup requests for incoming packet telephony calls from the softswitch at a network address translated from telephone addresses of the one or more subsystems or endpoints by the softswitch;
notifying an ACD application of the call setup request via a standards-based communication technique, the ACD application distinct from the call control proxy subsystem and the softswitch and coupled to the call control proxy subsystem and the one or more other subsystems or endpoints via computer-telephony integration (CTI) links, the ACD application to determine required ACD processing for incoming packet telephony calls in response to receiving notifications of the incoming packet telephony calls or the call setup requests from the call control proxy subsystem, the ACD application dynamically generating a standard language media processing script for the call prior to call setup with the one or more other subsystems or endpoints;
retrieving the media processing script from the ACD application; and
applying or generating media to the call according to the media processing script prior to call setup with the one or more other subsystems or endpoints.

38. The method of claim 37 and further comprising:
detecting a predetermined event;
routing the call from the media system to another endpoint upon detecting the predetermined event.

39. The method of claim 38 wherein the predetermined event may be one or more from the group including: receiving a predetermined input or response from a caller, an agent becoming available to process the call, or other change in call status or a request from a caller.

40. A method of processing packet telephony calls comprising:
receiving a call or call setup request at a call control proxy subsystem interposed between a softswitch and one or more other subsystems or endpoints, the call control proxy subsystem to register telephone addresses of the one or more other subsystems or endpoints with the softswitch and to handle call control for packet telephony calls received by the softswitch on behalf of the one or more other subsystems or endpoints, the call control proxy subsystem to receive call setup requests for incoming packet telephony calls from the softswitch at a network address translated from telephone addresses of the one or more subsystems or endpoints by the softswitch;
receiving instructions from an ACD application distinct from the call control proxy subsystem and the softswitch and coupled to the call control proxy subsystem and the one or more other subsystems or endpoints via computer-telephony integration (CTI) links, the ACD application to determine required ACD processing for incoming packet telephony calls in response to receiving notifications of the call setup request from the call control proxy subsystem, the ACD application dynamically generating a standard language media processing script comprising the instructions prior to call setup with the one or more other subsystems or endpoints;
processing the call based on the instructions;
detecting caller input or responses from the call;
sending the caller input or responses to the ACD application;
receiving additional instructions from the ACD application;
performing additional processing on the call based on the additional instructions; and
generating media according to instructions in a media processing script provided by the ACD application by a media subsystem coupled to the ACD application to generate media prior to call setup with the one or more other subsystems or endpoints, wherein the media subsystem comprises a media server.

41. A method of processing packet telephony calls comprising:
receiving a call or call setup request at a call control proxy subsystem interposed between a softswitch and one or more other subsystems or endpoints, the call control proxy subsystem to register telephone addresses of the one or more other subsystems or endpoints with the softswitch and to handle call control for packet telephony calls received by the softswitch on behalf of the one or more other subsystems or endpoints, the call control proxy subsystem to receive call setup requests for incoming packet telephony calls from the softswitch at a network address translated from telephone addresses of the one or more subsystems or endpoints by the softswitch;
applying media to the call prior to call setup with the one or more other subsystems or endpoints based on media processing instructions provided by an ACD application distinct from the call control proxy subsystem and the softswitch and coupled to the call control proxy subsystem and the one or more other subsystems or endpoints via computer-telephony integration (CTI) links, the ACD application to determine required ACD processing for an incoming packet telephony call in response to receiving notification of the call or call setup request from the call control proxy subsystem, the ACD application dynamically generating a standard language media processing script comprising the media processing instructions prior to call setup with the one or more other subsystems or endpoints;
detecting caller input or responses from the call;
sending the caller input or responses to the ACD application; and
performing additional processing on the call based on additional instructions provided by the ACD application.

42. The method of claim 41 wherein the media processing instructions are generated by the ACD application and provided as a standard language media processing script.

43. A method of processing packet telephony calls comprising:

receiving a call or call setup request at a call control proxy subsystem interposed between a softswitch and one or more other subsystems or endpoints, the call control proxy subsystem to register telephone addresses of the one or more other subsystems or endpoints with the softswitch and to handle call control for packet telephony calls received by the softswitch on behalf of the one or more other subsystems or endpoints, the call control proxy subsystem to receive call setup requests for incoming packet telephony calls from the softswitch at a network address translated from telephone addresses of the one or more subsystems or endpoints by the softswitch;

sending media processing instructions over a network to a calling node, the media processing instructions provided by an ACD application distinct from the call control proxy subsystem and the softswitch and coupled to the call control proxy subsystem and the one or more other subsystems or endpoints via computer-telephony integration (CTI) links, the ACD application to determine required ACD processing for an incoming packet telephony call in response to receiving notification of the call or the call setup request from the call control proxy subsystem, the ACD application dynamically generating a standard language media processing script comprising the media processing instructions prior to call setup with the one or more other subsystems or endpoints; and the calling node locally applying or generating media based on the media processing instructions prior to call setup with the one or more other subsystems or endpoints.

44. The method of claim 43 wherein the media processing instructions are generated by the ACD application and are provided as a standard language media processing script to the calling node.

45. The method of claim 43 and further comprising:
the calling node detecting caller input or responses;
sending the caller input or responses over the network to the ACD application;
the ACD application providing additional media processing instructions to the calling node based on the input or responses; and
the calling node locally applying or generating additional media based on the additional media processing instructions.

46. The method of claim 43 and further comprising:
the calling node detecting caller input or responses;
sending the caller input or responses over the network to the ACD application;
the ACD application controlling call routing or other call processing functions for the call based on the caller input or responses.

47. A method comprsing:
receiving a request from a calling node from a call control proxy subsystem at an automatic call distributor (ACD) application, the call control proxy subsystem interposed between a softswitch and one or more other subsystems or endpoints, the ACD application distinct from the call control proxy subsystem and the softswitch and coupled to the call control proxy subsystem and the one or more other subsystems or endpoints via computer-telephony integration (CTI) links, the call control proxy subsystem to register telephone addresses of the one or more other subsystems or endpoints with the softswitch and to handle call control for packet telephony calls received by the softswitch on behalf of the one or more other subsystems or endpoints, the call control proxy subsystem to receive call setup requests for incoming packet telephony calls from the softswitch at a network address translated from telephone addresses of the one or more subsystems or endpoints by the softswitch, the ACD application to determine required ACD processing for an incoming packet telephony calls in response to receiving notifications of the incoming packet telephony calls or the call setup requests from the call control proxy subsystem;

dynamically generating a standard language media processing script at the ACD application in response to the request prior to call setup with the one or more other subsystems or endpoints;

providing the media processing script over a network to the calling node; and the calling node locally generating media based on the media processing script prior to call setup with the one or more other subsystems or endpoints.

* * * * *